United States Patent Office 3,028,367
Patented Apr. 3, 1962

3,028,367
COPOLYMERS OF HYDROXYALKYL ACRYLATES AND METHACRYLATES AND ALKYL ACRYLATES AND METHACRYLATES REACTED WITH DIISOCYANATES
Joseph L. O'Brien, Elkins Park, Pa., assignor to Rohm & Haas Company, Philadelphia, Pa., a corporation of Delaware
No Drawing. Filed Apr. 14, 1958, Ser. No. 728,070
6 Claims. (Cl. 260—77.5)

This invention relates to low-molecular weight copolymers of hydroxyalkyl acrylates and/or methacrylates having an alkylene group containing two to six carbon atoms and alkyl acrylates and/or methacrylates having one to eight carbon atoms in the alkyl group, and to methods for their preparation.

According to this invention there are provided new and valuable copolymers having an average molecular weight of about 500 to about 3000 and which have a functionality, defined as the average number of hydroxyl groups per polymer chain, of at least 2.0 but not more than 3.5. The hydroxyl-containing copolymers of the present invention differ essentially from previously known copolymers or so-called adducts or telomers of alkyl acrylates or methacrylates in that they have an extremely low and relatively narrow molecular weight range and contain reactive hydroxyl groups as an integral part of the polymer chains. Furthermore, these reactive hydroxyl groups are spaced randomly along the entire length of the polymer chain and are not present merely as end-groups.

The present low-molecular weight copolymers are prepared by heating together in solution in a suitable solvent a mixture of one or more hydroxyalkyl acrylates or methacrylates having an alkylene group containing two to six carbon atoms and one or more alkyl acrylates or methacrylates having one to eight carbon atoms in the alkyl group, in the presence of a free-radical-liberating agent as catalyst and an organic thiol (—SH) compound which serves as a molecular weight regulator.

Depending upon the individual reactants and the catalyst and regulator employed, it is generally desirable to employ a reaction temperature of from about 100° C. to about 150° C. Solvents which are suitable for this reaction are those compounds which will dissolve both the reactants and the product and which have a boiling point somewhat above 100° C. It is also desirable that the solvent be relatively inert to the action of the free-radicals liberated by the catalyst and to reaction with the thiol (—SH) groups present in the regulator. Such solvents include ethylene glycol monomethyl ether, ethylene glycol monoethyl ether, propylene glycol monomethyl ether, dimethylformamide, or the like.

The hydroxyl-containing monomers suitable for the preparation of the above products have the general formula

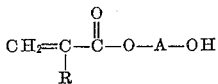

wherein R is an hydrogen atom or a methyl group and A is an alkylene group containing two to six carbon atoms. Examples of such monomers are hydroxyethyl acrylate or methacrylate, hydroxypropyl acrylate or methacrylate, hydroxyhexyl acrylate or methacrylate, etc.

Alkyl esters of acrylic or methacrylic acid which may be employed are those represented by the general formula

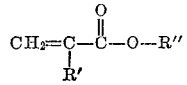

wherein R' is an hydrogen atom or a methyl group and R" is an alkyl group having from one to eight carbon atoms. Such esters include, e.g., methyl, ethyl, propyl, isopropyl, butyl, isobutyl, amyl, isoamyl, hexyl, heptyl, 2-ethylhexyl and octyl acrylate or methacrylate.

Free-radical-liberating agents which may be employed as catalysts for the present purpose include, e.g., benzoyl peroxide, tert-butyl peracetate, tert-butyl perbenzoate, tert-butyl hydroperoxide, etc.

Organic thiol (—SH) compounds which may be employed as molecular weight regulators include, e.g., the methyl or ethyl esters of thioglycollic acid, mercaptoethanol, tert-octyl mercaptan, n-dodecyl mercaptan, etc. Mercaptoethanol is particularly well-suited for this purpose because the hydroxyethyl sulfide end-group derived from this regulator contributes to the over-all hydroxyl-group functionality of the polymeric products. In accordance herewith such compounds are used in the process for preparing the polymeric products in an amount from about 5 mole percent to about 17 mole percent, based on the total moles of monomer being subjected to polymerization.

According to the present invention there are prepared polymeric products having the general formula:

$$R°S—[(X)_m—(Y)_n]—H$$

wherein R° is a member of the class consisting of hydroxyethyl, an alkyl group of three to twelve carbon atoms, and R'''OOCCH₂ wherein R''' is an alkyl group of one to eight carbon atoms, X is at least one group of the formula

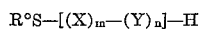

Y is at least one group of the formula

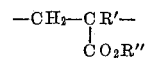

where R and R' are an hydrogen atom or a methyl group, R" is an alkyl group of one to eight carbon atoms, A is an alkylene group containing two to six carbon atoms, and *m* and *n* are each at least two.

The hydroxyl-containing copolymers of the present invention are useful for the preparation of polymeric resins with other polyfunctional reactants, such as diisocyanates, dicarboxylic acids, diepoxides, as well as urea-formaldehyde condensates, or the like. Because the present copolymers have an average hydroxyl functionality of at least 2.0, these reactions generally lead to high-molecular weight, crosslinked polymeric products. Particularly advantageous for this purpose are the organic diisocyanates, such as 2,4-tolylene diisocyanate, methylenebis(phenyl isocyanate), methylenebis(2-methylphenyl isocyanate), meta-xylylene diisocyanate, p-menthane diisocyanate, or the like. Such compositions have certain desirable characteristics for use as low-pressure laminating and casting resins, such advantages as low shrinkage, low exotherm and lack of air-inhibition during cure. Another useful application for these reactive compositions is in the field of solventless coating vehicles.

The preparation of the reactive copolymers may be effected by mixing together the alkyl acrylate or methacrylate, the hydroxyalkyl acrylate or methacrylate, the catalyst, regulator and solvent and maintaining the resulting mixture, advantageously with agitation, at a temperature of from about 100° C. to about 150° C. until the decomposition of the catalyst and/or the conversion of the monomeric reactants is completed. Or, if desired, the catalyst may be added gradually to a mixture of the other reactants maintained at a temperature of from about 100° C. to about 150° C. with agitation. This variation has the advantage that the total amount of catalyst is not subjected to the temperature of reaction at once and insures a more steady liberation of free-radicals to catalyze the reaction. Alternatively, a mixture of the monomeric esters and the catalyst may be added gradually to a mixture of the solvent and regulator while maintaining the latter at the reaction temperature with agitation. The reaction time may vary from, say, several hours to several days. It is advantageous to maintain an atmosphere of an inert gas, suc has nitrogen or carbon dioxide, in the reaction vessel. The use of such an inert atmosphere minimizes oxidation of the reactants or solvent and leads to light-colored products.

Following the reaction period, the solution of the product is subjected to reduced pressure and heated, as required, to remove the solvent and any unreacted material which may be present.

The following examples represent certain preferred methods of operation of this invention. The specific times, temperatures, and ratios of reactants employed therein are to be construed as typical and non-limiting of said invention.

*Example I*

A mixture of 2600 g. of dimethylformamide and 11.7 g. of mercaptoethanol was placed in a flask fitted with a stirrer, adddition funnel, reflux condenser and gas inlet and outlet tubes. The mixture was heated to 140–145° C. with stirring while a slow stream of carbon dioxide was passed through the system. There was added all at once a mixture of 273 g. of butyl methacrylate, 134 g. of hydroxypropyl methacrylate, and 200 g. of dimethylformamide. When the temperature of the resultant mixture had adjusted to 130–135° C., there was begun the dropwise addition of a mixture of 32.5 g. of a 75% solution of tert-butyl peracetate in benzene and 200 g. of didimethylformamide. Addition of the latter mixture required a total of five hours. The reaction mixture was then stirred and heated for an additional six hours at 130–135° C. At the end of that time, the solvent dimethylformamide was removed by distillation at reduced pressure.

The liquid residue from the above reaction was stirred and heated at 130–140° C. for four hours under vacuum in order to remove the last traces of solvent and any unreacted materials. There was obtained a light-amber colored, viscous (at room temperature) liquid product which weighed 381 g. (91% yield) and analyzed as follows:

Molecular weight (ebulliometric) _____ 941
Hydroxyl number _____ 149.5
Calculated value of $f$ [1] _____ 2.51

$f$ = average number of hydroxyl groups per polymer chain $$\text{Hydroxyl number} = \frac{56{,}100 \times f}{\text{mol. wt.}}$$

[1] Therefore $f$ (functionality) $= \frac{\text{hydroxyl No.} \times \text{mol. wt.}}{56{,}100}$

*Example II*

A mixture of 3000 g. of ethylene glycol monomethyl ether and 20.0 g. of mercaptoethanol was placed in a reaction flask as in Example I and heated to reflux (approximately 125° C.) with stirring under an atmosphere of carbon dioxide. A mixture of 210 g. of butyl methacrylate, 120 g. of hydroxypropyl methacrylate, and 200 g. of ethylene glycol monomethyl ether was then added all at once. When the resultant mixture had returned to the reflux temperature, there was begun the dropwise addition of a mixture of 33 g. of a 75% solution of tert-butyl peracetate in benzene and 200 g. of ethylene glycol monomethyl ether. Addition of the latter mixture required a total of five hours. The reaction mixture was refluxed for an additional hour. At the end of that time, the solvent was removed by distillation at reduced pressure.

The liquid residue was stirred and heated to 130° C. at 1.5 mm. for four hours in order to remove the last traces of solvent and any unreacted materials. There was obtained a light yellow, viscous liquid which weighed 332.5 g. (95% yield) and analyzed as follows:

Molecular weight (ebulliometric) _____ 789
Hydroxyl number _____ 185
Calculated value of $f$ _____ 2.59

The above product had a color of 2+ on the Gardner 1933 scale and a viscosity of $Z_{10}++$ (Gardner-Holdt at 25° C.). A 75% solution of the product in ethylene glycol monomethyl ether had a viscosity of I (Gardner-Holdt at 25° C.).

*Example III*

Using substantially the same procedure as in Example II and employing the following materials: 120 g. of methyl methacrylate, 72 g. of hydroxypropyl methacrylate, 23.4 g. of mercaptoethanol, 25.5 g. of a 75% solution of tert-butyl peracetate in benzene and 2880 g. of ethylene glycol monomethyl ether, there was obtained a very light yellow, viscous liquid which weighed 213 g. (98% yield) and analyzed as follows:

Molecular weight (ebulliometric) _____ 560
Hydroxyl number _____ 203
Calculated value of $f$ _____ 2.02

*Example IV*

Using substantially the same procedure as in Example II and employing the following materials: 130.6 g. of butyl methacrylate, 24.0 g. of methyl methacrylate, 92.2 g. of hydroxypropyl methacrylate, 17.3 g. of mercaptoethanol, 26.4 g. of a 75% solution of tert-butyl peracetate in benzene and 2700 g. of ethylene glycol monomethyl ether, there was obtained 234 g. (89% yield) of a light yellow, viscous liquid which analyzed as follows:

Molecular weight (ebulliometric) _____ 851
Hydroxyl number _____ 168.5
Calculated value of $f$ _____ 2.56

*Example V*

Using substantially the same procedure as in Example II and employing the following materials: 86 g. of butyl methacrylate, 86 g. of methyl methacrylate, 116 g. of hydroxypropyl methacrylate, 20.4 g. of mercaptoethanol, 31.0 g. of a 75% solution of tert-butyl peracetate in benzene and 3400 g. of ethylene glycol monomethyl ether, there was obtained an 84% yield of a light yellow, slightly hazy, viscous liquid which analyzed as follows:

Molecular weight (ebulliometric) _____ 829
Hydroxyl number _____ 200
Calculated value of $f$ _____ 2.95

*Example VI*

Using substantially the same procedure as in Example II and employing the following materials: 210 g. of butyl methacrylate, 108 g. of hydroxyethyl methacrylate, 20.5 g. of mercaptoethanol, 33.8 g. of a 75% solution of tert-butyl peracetate in benzene and 3400 g. of ethylene glycol monomethyl ether, there was obtained 322.5 g. (95% yield) of a light yellow, viscous liquid which analyzed as follows:

Molecular weight (ebulliometric) _____ 805
Hydroxyl number _____ 182
Calculated value of f _____ 2.61

Example VII

Using substantially the same procedure as in Example II and employing the following materials: 97 g. of 2-ethylhexyl methacrylate, 60 g. of butyl methacrylate, 60.5 g. of hydroxypropyl methacrylate, 10.0 g. of mercaptoethanol, 20.8 g. of a 75% solution of tert-butyl peracetate in benzene and 1700 g. of ethylene glycol monomethyl ether, there was obtained 219 g. (96% yield) of a colorless, viscous liquid which analyzed as follows:

Molecular weight (ebulliometric) _____ 1033
Hydroxyl number _____ 134
Caluculated value of f _____ 2.46

Example VIII

Using substantially the same procedure as in Example I and employing the following materials: 35.5 g. of butyl methacrylate, 15.4 g. of hydroxypropyl methacrylate, 4.07 g. of dodecyl mercaptan, 2.85 g. of a 75% solution of tert-butyl peracetate in benzene and 500 g. of dimethylformamide, there was obtained 46 g. (83.5% yield) of a light amber, viscous liquid which analyzed as follows:

Molecular weight (ebulliometric) _____ 1050
Hydroxyl number _____ 109
Calculated value of f _____ 2.04

Example IX

Using substantially the same procedure as in Example I and employing the following materials: 35.5 g. of butyl methacrylate, 14.3 g. of hydroxypropyl methacrylate, 1.43 g. of mercaptoethanol, 3.5 g. of tert-butyl hydroperoxide and 430 g. of dimethylformamide, there was obtained 40.5 g. (79% yield) of a golden, viscous liquid which analyzed as follows:

Molecular weight (ebulliometric) _____ 879
Hydroxyl number _____ 138
Calculated value of f _____ 2.16

Example X

Using substantially the same procedure as in Example I and employing the following materials: 35.5 g. of butyl methacrylate, 17.4 g. of hydroxybutyl methacrylate, 1.56 g. of mercaptoethanol, 3.0 g. of a 75% solution of tert-butyl peracetate in benzene and 250 g. of dimethylformamide, there was obtained 47 g. (86% yield) of a light amber, viscous liquid which analyzed as follows:

Molecular weight (ebulliometric) _____ 1234
Hydroxyl number _____ 136
Calculated value of f _____ 2.99

Example XI

Using substantially the same procedure as in Example I and employing the following materials: 27.3 g. of butyl methacrylate, 8.0 g. of ethyl acrylate, 15.6 g. of hydroxypropyl methacrylate, 1.56 g. of mercaptoethanol, 1.98 g. of a 75% solution of tert-butyl peracetate in benzene and 430 g. of dimethylformamide, there was obtained 47.5 g. (90% yield) of a light yellow semi-solid, which analyzed as follows:

Molecular weight (ebulliometric) _____ 1040
Hydroxyl number _____ 144.5
Calculated value of f _____ 2.67

Example XII

Using substantially the same procedure as in Example I and employing the following materials: 27.3 g. of butyl methacrylate, 14.7 g. of 2-ethylhexyl acrylate, 15.6 g. of hydroxypropyl methacrylate, 1.56 g. of mercaptoethanol, 1.98 g. of a 75% solution of tert-butyl peracetate in benzene and 430 g. of dimethylformamide, there was obtained 55.7 g. (94% yield) of a very light yellow, viscous liquid which analyzed as follows:

Molecular weight (ebulliometric) _____ 1218
Hydroxyl number _____ 128
Calculated value of f _____ 2.78

Example XIIA

Using substantially the same procedure as in Example I and employing the following materials: 70.0 g. of butyl methacrylate, 39.4 g. of hydroxypropyl methacrylate, 3.14 g. of mercaptoethanol, 6.13 g. of a 75% solution of tert-butyl peracetate in benzene and 860 g. of dimethylformamide, there was obtained 101 g. (90% yield) of a clear, light yellow semi-solid, which analyzed as follows:

Molecular weight (ebulliometric) _____ 1187
Hydroxyl number _____ 165
Calculated value of f _____ 3.49

The following examples illustrate the preparation of hard, tough, thermoset resins within the scope of this invention.

Example XIII

A mixture of 65.3 g. of the copolymer product of Example I and 9.8 g. of dipropylene glycol was stirred under reduced pressure at 55–60° C. for ten minutes. There was then added over a ten-minute period 27.8 g. of 2.4-tolylene diisocyanate. Stirring under reduced pressure was continued briefly, then the reaction product was poured into a small aluminum mold. The resin was cured by heating in an oven at 100° C. for sixteen hours. There was obtained a clear, bubble-free casting of pale amber color. The cured product was relatively hard (Barcol value of 26–30) and tough. Determination of the impact strength by the Izod unnotched test gave a value of 2.20 ft. lbs. per inch of width of impact face (A.S.T.M. 256–47T). The flexural strength was 7530 p.s.i. (A.S.T.M. D–790–45T). Heat distortion temperature of this product was 64.0° C. (A.S.T.M. D–648–45T).

Example XIV

Using substantially the same procedure as in Example XIII, but employing an equal weight of 1,2,6-hexanetriol instead of the dipropylene glycol, there was obtained a cured product with the following physical properties:

Barcol hardness_____ 38
Impact strength_____ft. lebs./in.___ 5.26
Flexural strength_____p.s.i.__ 13,540
Heat distortion temperature_____C__ 77.8°

Example XV

Using substantially the same procedure as in Example XIII and employing the following materials: 42.3 g. of the liquid copolymer product of Example II, 6.4 g. of 1,2,6-hexanetriol, and 24.4 g. of 2,4-tolylene diisocyanate, there was obtained after curing three hours at 135° C. a clear, tough casting with a Barcol hardness value of 35.

Example XVI

Using substantially the same procedure as in Example XIV, there was obtained a liquid resin which was spread on a glass plate. The plate was heated in an oven at 130° C. for four hours. The resultant film was clear, colorless, and hard (pencil hardness value of 5H). Further curing of the film for four hours at 165° C. gave no apparent increase in hardness (still 5H), but did improve somewhat the resistance of the film to attack by solvents.

Example XVII

A mixture of 100 parts by weight of the liquid polymeric product of Example V and 20 parts by weight of 1,2,6-hexanetriol was stirred under reduced pressure at a temperature of 45° C. for 15 minutes. There was then added all at once 70 parts by weight of tolylene diisocyanate containing 65% of the 2,4-isomer and 35% of the 2,6-isomer. Stirring under reduced pressure was resumed until a homogeneous solution was obtained (after about five minutes). The vacuum was then released and the product was poured into flat glass molds lined with cellophane to facilitate release. The product was cured by heating the molds for sixteen hours at 100° C. and finally for two hours at 130° C. Physical properties were obtained on suitable specimens prepared from the cast product. These are listed below:

Barcol hardness___ 47.
Impact strength___ 11.2 ft. lbs./in. (Charpy Unnotched).
Flexural strength__ 19,200 p.s.i.

*Example XVIII*

A mixture of 100 parts by weight of the liquid copolymeric product of Example II and 20 parts by weight of 1,2,6-hexanetriol was stirred at a temperature of 60° C. until mixing was complete. There was then added all at once 86 parts by weight of p-menthane diisocyanate. Stirring at 60° C. was continued until a homogeneous solution resulted. The liquid was cooled to 30° C. and 2 parts by weight of a commercial zinc naphthenate solution containing 8% zinc was added. The mixture was stirred under reduced pressure for about ten minutes, when the vacuum was released and the resin was poured into flat glass molds lined with cellophane to facilitate release. The product was cured by heating the molds in an oven according to the following cure cycle: 16 hours at 70° C., one hour at 85° C., one hour at 100° C., and two hours at 120° C. Physical properties were obtained on suitable specimens prepared from the cast product. These are listed below:

Barcol hardness_____ 29.
Impact strength_____ 3.86 ft. lbs./in. (Izod Unnotched).
Flexural strength____ 14,100 p.s.i.

What I claim is:

1. A hard, tough thermoset resin formed by reacting together at a temperature of from about 50° C. to about 150° C. at least one compound from each of the three groups as follows:
   (a) A low molecular weight copolymer of from about 20 mole percent to about 40 mole percent of a compound selected from the class consisting of hydroxyalkyl acrylates and methacrylates and about 60 mole percent to about 80 mole percent of a compound selected from the class consisting of alkyl acrylates and methacrylates, having an average number of hydroxyl groups per polymer chain of at least 2 but not more than 3.5,
   (b) A compound selected from the class consisting of dihydric and trihydric alcohols, and
   (c) An organic diisocyanate, in the ratio, per 100 parts of (a), of about 15 to 20 parts of (b) and about 40 to 90 parts of (c).

2. A product as defined in claim 1 wherein the compound from group (a) is a copolymer of hydroxypropyl methacrylate and butyl methacrylate.

3. A product as defined in claim 1 wherein the compound from group (a) is a copolymer of hydroxyethyl methacrylate and 2-ethylhexyl methacrylate.

4. A product as defined in claim 1 wherein the compound from group (b) is 1,2,6-hexanetriol.

5. A product as defined in claim 1 where the organic diisocyanate is tolylene diisocyanate.

6. A product as defined in claim 1 wherein the organic diisocyanate is p-menthane diisocyanate.

References Cited in the file of this patent

UNITED STATES PATENTS

| | | |
|---|---|---|
| 2,129,722 | Woodhouse | Sept. 13, 1938 |
| 2,381,063 | Kung | Aug. 7, 1945 |
| 2,396,997 | Fryling | Mar. 19, 1946 |
| 2,434,054 | Roedel | Jan. 6, 1948 |
| 2,484,487 | Caldwell | Oct. 11, 1949 |
| 2,492,170 | Mast et al. | Dec. 27, 1949 |
| 2,681,897 | Frazier et al. | June 22, 1954 |
| 2,879,178 | McWherter et al. | Mar. 24, 1959 |
| 2,965,615 | Tess | Dec. 20, 1960 |